United States Patent [19]

Keeney et al.

[11] Patent Number: 5,019,339
[45] Date of Patent: May 28, 1991

[54] CONTROL SYSTEM FOR ODOR ELIMINATING APPARATUS

[75] Inventors: Lawrence V. Keeney, Boulder City; William B. Misch; James H. Parrott, both of Las Vegas, all of Nev.

[73] Assignee: Pacific Engineering and Production Co. of Nevada, Henderson, Nev.

[21] Appl. No.: 160,701

[22] Filed: Feb. 26, 1988

[51] Int. Cl.$^5$ .............................................. G05B 1/00
[52] U.S. Cl. .......................................... 422/3; 422/4; 422/5; 422/110; 422/111; 422/172; 422/126; 422/177; 422/168
[58] Field of Search ..................... 422/3, 45, 108, 110, 422/111, 122, 126, 168, 177

[56] References Cited

U.S. PATENT DOCUMENTS

| | | | |
|---|---|---|---|
| 4,256,710 | 3/1981 | Azuma et al. | 422/4 |
| 4,307,067 | 12/1981 | Tagawa et al. | 422/5 |
| 4,416,861 | 11/1983 | de Vries | 422/4 |
| 4,460,552 | 7/1984 | Zakrewski | 422/3 |

OTHER PUBLICATIONS

Treatment Plant Ends Odor Problem, Pepcon OdorMaster II.
Pepcon Electrolytic Systems, Pacific Engineering Pepcon OdorMaster I, Pacific Engineering.
Tannery Odors in Town Eliminated by Special Scrubber Towers, Pepcon OdorMaster II System for Maximum Treatment of Complex Odors.
Automatic Controller for Use with OdorMaster I, II or III Gas Odor Control Systems Pepcon OdorMaster I treats Odors 5 Ways.
San Diego G & E Shows how to Make Sodium Hypochlorite for Cooling Water Treatment, Producing disinfectant on-site is effective at wastewater plant.
Sodium Hypochlorite System Controls Odor, Triple-Stage Odor Control Helps Clean the Air.
Splashings-Kansas Water Pollution Control Association, Combined System Controls Sludge Tank Odors.
Pepcon OdorMaster II, Treatment Plant Ends Odor Problem.

Primary Examiner—Robert J. Warden
Assistant Examiner—Timothy M. McMahon
Attorney, Agent, or Firm—William D. Hall

[57] ABSTRACT

An odor control system neutralizes odors from any source such as those from a sewage disposal plant. The odor control system recirculates a brine solution containing NaOCl. This recirculated solution contacts the unwanted odors to neutralize them. Sufficient NaOCl is added electrochemically to the solution to neutralize the unwanted odors under normal operating conditions. When there are peak odor conditions the unwanted odors exceed the capacity of the electrochemically produced NaOCl. During such peak conditions, supplemental concentrated NaOCl is added from a storage tank. The concentration of the NaOCl in the soolution is determined by sensing the oxidation reduction potential (ORP) in the solution to produce an ORP signal. The ORP signal controls the concentration of NaOCl in the solution including that supplied electrochemically as well as that supplied from the storage tank. This system is more economical than electrochemical systems for producing NaOCl in quantities large enough to supply the required NaOCl during peak conditions.

32 Claims, 8 Drawing Sheets

CONTROL SYSTEM FOR ODOR ELIMINATING APPARATUS

BACKGROUND OF THE INVENTION

This invention is in the field of eliminating odors emanating from any source, such as, for example, sewage disposal plants.

The OdorMaster System manufactured and sold by the assignee of the present inventors discloses a scrubber tower in which a spray of a brine solution containing sodium hypochlorite (NaOCl) is directed downwardly onto a plastic packing. The gases with malodorous odors pass upwardly through the packing. The problem, however, resides in providing the sodium hypochlorite most efficiently. The malodorous gasses can vary in quantity as well as the percentage of odor producing material in the gasses. Therefore, "concentration" or "strength" of the sodium hypochlorite solution sprayed onto the packing should vary in accordance with the variations in the amount of odor producing materials. The OdorMaster solves this problem within limits. That system has a built-in system for manufacturing the sodium hypochlorite. The built-in system comprises positive and negative electrodes positioned in spaced relation, through which a brine solution is circulated. The amplitude of the direct current passed through the bath (via said electrodes) is then varied in accordance with the concentration of sodium hypochlorite needed. The amount of brine solution sprayed is a constant as measured in gallons per minute; the strength or concentration of the sodium hypochlorite varying as needed. The limitation on this system is one of economics. The electrolytic system generates sodium hypochlorite at lower cost than it can be purchased on the open market and fed to the scrubber from a supply tank. The electrolytic system, however, loses its economic advantage if it is large enough to supply all of the sodium hypochlorite needed during peaks of the malodorous odors.

SUMMARY OF THE INVENTION

The purpose of this device is to provide a superior "wet scrubber" odor control system, while at the same time providing reduced capital and operating costs, by allowing utilization of a combination of low concentration on-site generated sodium hypochlorite (NaOCl) and high concentration commercially available high concentration NaOCl. The advantage of this concept over existing systems which utilize either on-site generated NaOCl or commercial oxidant exclusively, is that the on-site sodium hypochlorite generating system can then be sized to generate only the amount of low concentration oxidant required to control the base (average) level of odorous contaminants coming to the system while the intermittent peak levels are controlled by automatically supplying the scrubber system with supplemental commercially available high concentration sodium hypochlorite. The on-site generating system produces sodium hypochlorite at a cost typically lower than that for commercial sodium hypochlorite providing a saving in operating cost, while the cost of the capital equipment is reduced by not having to design the on-site generation system large enough to handle peak odorous contaminant loads. This combination odor control system also retains the advantage, over systems employing only purchased oxidants, of added control of certain more difficult to oxidize contaminants by oxidation at the anodes of the electrolytic cells employed in the on-site NaOCl generation system, and because electrolytically produced sodium hypochlorite is more active than commercially available sodium hypochlorite containing free alkali (as more fully explained in the textbook Inorganic Chemistry by Fritz Ephraim, page 366).

The device continually measures the oxidation reduction potential (ORP) which is a function of the residual chlorine in the NaOCl oxidizing solution in the scrubber basin. An ouput signal from the device modulates the output current level of the on-site NaOCl system rectifier (D.C. power supply) thereby controlling the sodium hypochlorite production rate in response to the varying contaminant level in the gas stream being treated. The device compares the actual ORP in the scrubber basin with the desired ORP per a pre-selected set-point. If the actual ORP is less than the set-point, the device increases the rectifier current which in turn increases the production of NaOCl. If the oxidant demand exceeds the production capacity of the on-site NaOCl generating system, then the device activates an injection pump which transfers supplemental high concentration commercially available hypochlorite from a storage container to the scrubber tower. The supplemental oxidant pumping rate is also controlled by the device. The greater the oxidant demand in excess of the capacity of the on-site generation system, the greater the pumping rate for the supplemental purchased oxidant. If the residual chlorine level in the scrubber basin subsequently exceeds the set-point, the supplemental NaOCl pumping rate will slowly be decreased. Once the oxidant demand is again within the capacity of the on-site NaOCl generation system, pumping of the supplemental purchased NaOCl is automatically terminated. If the oxidation reduction potential (ORP) in the scrubber basin still exceeds the set-point, the rectifier output is slowly decreased resulting in a decrease in the production rate of the on-site generated NaOCl.

The further the actual ORP is from the set-point, the faster the rate of change of production of on-site hypochlorite and/or the commercially available sodium hypochlorite pumping rate. This is accomplished by a proportional/integrating section of the device.

The ORP probe has a signal output which is integrated to thereby smooth the controlling action of the system; so that substantial, or rapid or even erratic variations in the ORP signal are developed into (1) smooth variations in the production of on-site NaOCl, and (2) smooth control over addition of the commercial supplemental high concentration NaOCl.

The main differences between the present invention and the prior art OdorMaster described above is (1) the addition of the supplemental supply means for supplying high concentration NaOCl, (2) the revision of the electrical control system to add NaOCl to the system during peak conditions, and (3) making the on-site NaOCl producing equipment of just sufficient size to supply the needed NaOCl for normal amounts of unwanted odors; so that the efficiency of the system is increased.

The system shown in the above cited drawings is usually part of a larger system that emits odors, for example a sewage disposal plant. The sewage disposal plant, or other source of odor, normally produces odors that can be fully neutralized by the NaOCl produced on-site, but during peak odor conditions the system supplements the on-site NaOCl with concentrated NaOCl from a storage tank as will appear.

DETAILED DESCRIPTION OF THE DRAWINGS

Figure 1:
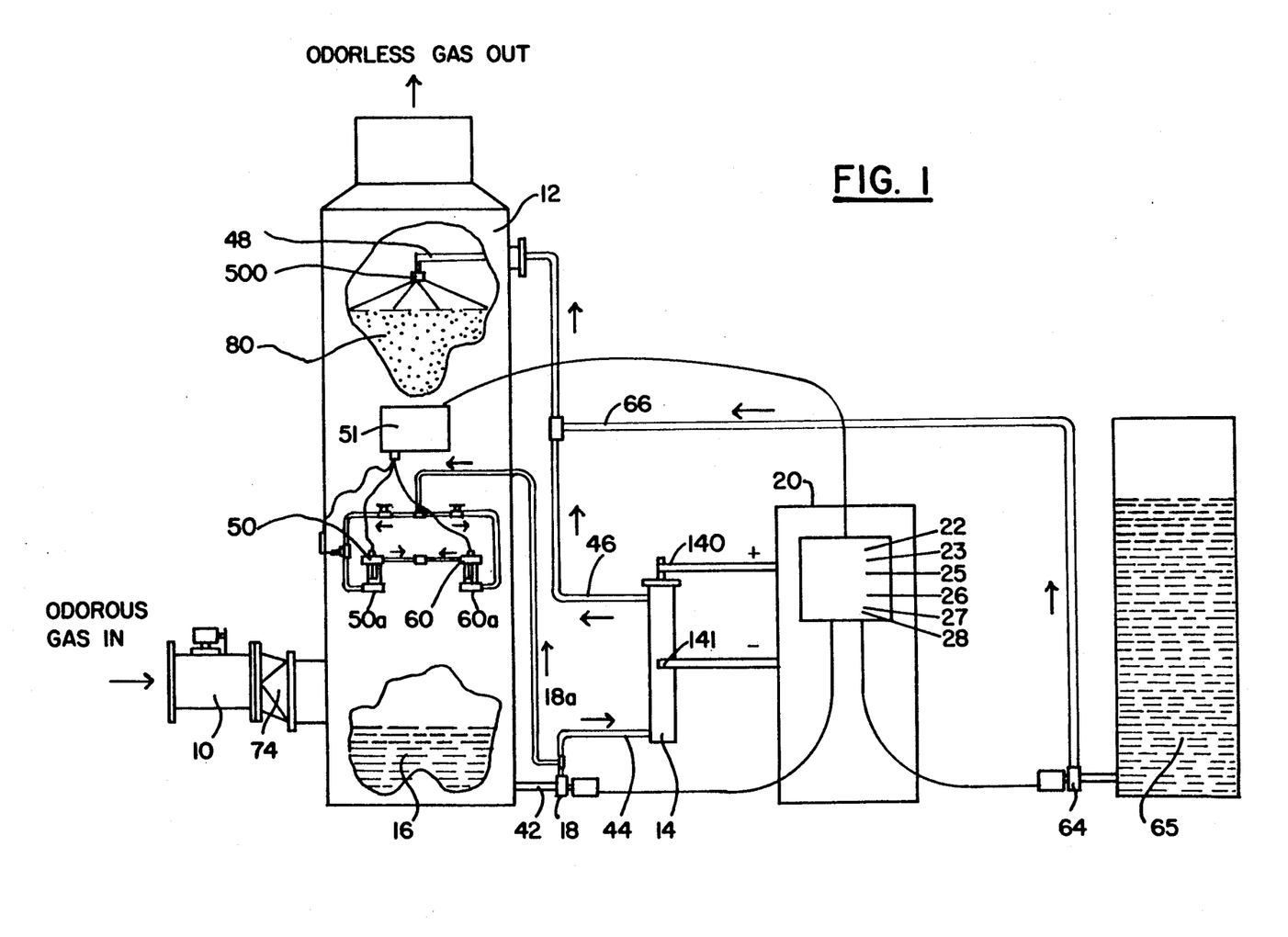
FIG. 1 is a view of the system comprising the invention.

Referring to FIG. 1, the air to be treated is collected from the site producing malodorous air by suitable ventilation ductwork (not shown), and is drawn into the scrubber 12 by blower 10. Blower 10 draws the air thru duct 74 into the bottom of the scrubber tower 12. In scrubber tower 12, which is a conventional packed scrubbing tower in this embodiment having a conventional packing material 80 therein (e.g., plastic material, polypropylene saddles, pall rings, or the like), the air rises against the downwardly flowing scrubbing solution being sprayed into the top of the tower. This scrubbing solution is a salt brine (e.g., NaCl) having a salt concentration of about 2 wt. % to 20 wt. %. The brine contains sodium hypochlorite (NaOCl) as hereinafter explained.

The brine scrubbing solution is continuously recirculated between scrubber tower 12 and electrochemical cells 14 by taking the brine from basin 16 of scrubber tower 12 and pumping it through electrochemical cells 14 using pump 18. The brine passes through pipe 42, pump 18, pipe 44, electrochemical cells 14 and pipe 46 to the top of scrubber tower 12. The brine enters the top of scrubber tower 12 through pipe 48 to spray nozzle 500 which sprays the brine down scrubber tower 12. The solution then collects in basin 16 whereupon the solution is recycled as described below.

Figure 6:
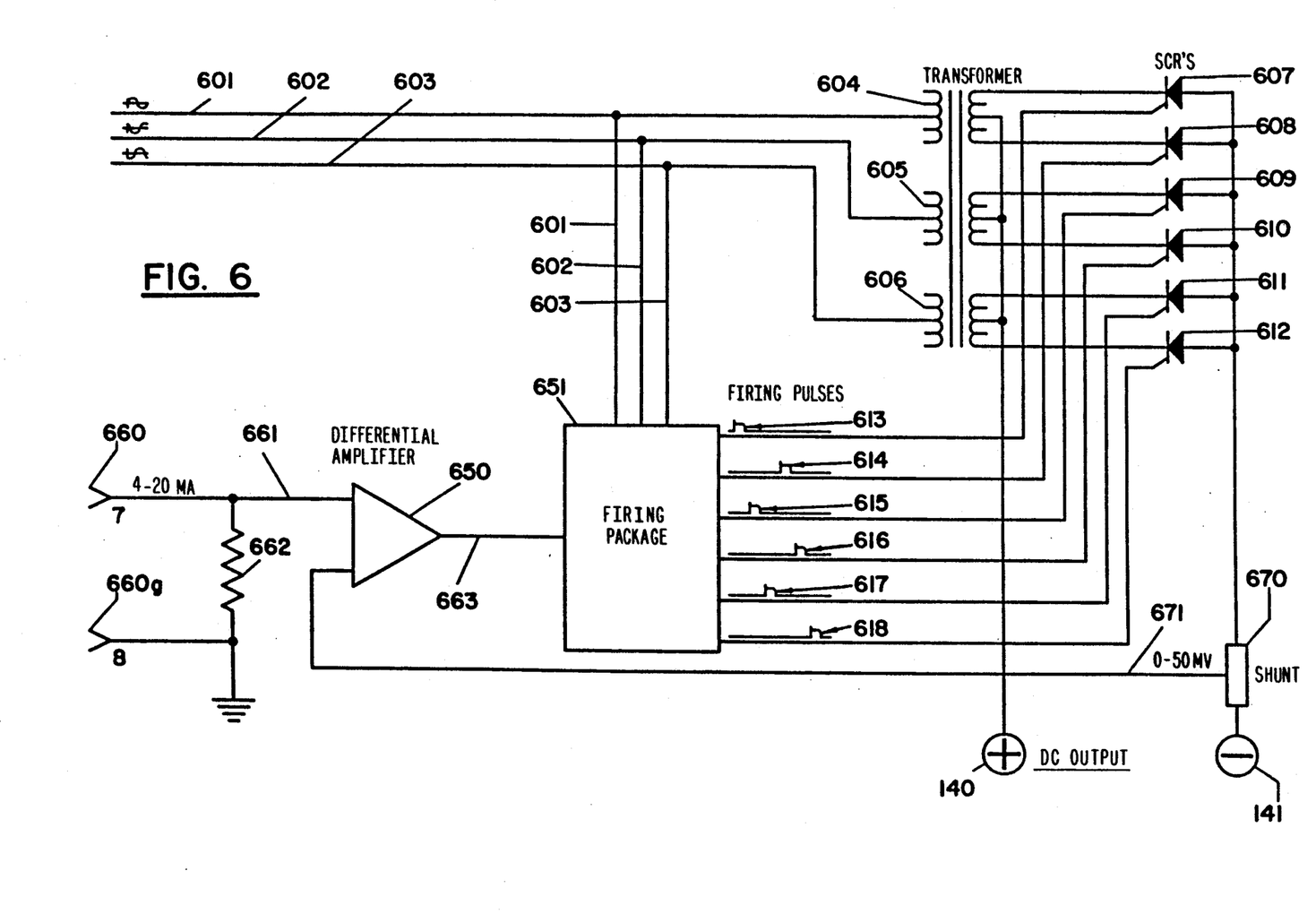
FIG. 6 is a block diagram of a prior art circuit for producing a direct current to the on-site electrochemical bath for producing NaOCl.

Cells 14 are powered by the rectifier system of FIG. 6. FIG. 1 shows one electrochemical cell but it is to be understood that any number or size of cells may be used and a wide variety of cell configurations may be used.

Various "fail safe" devices can be incorporated into the system to shut the rectifier and interlocked components down in case of loss of flow, pump or blower failure, or high temperature in the system. These "fail safe" devices are well known to those knowledgeable in the state of the art.

The brine passes through cells 14. A part of the salt in the brine scrubbing solution converts into sodium hypochlorite when it passes through electrochemical cells 14 in accordance with the following reaction:

For most systems contemplated by this invention, the hypochlorite solution emerging from the cells will have a concentration of about 0.02 wt. % to 0.7 wt. %. The concentration can be varied, of course, depending on the composition and concentration of the malodorous substances being removed.

The scrubbing solution, containing the sodium hypochlorite, flows downwardly through the packed scrubbing tower contacting, oxidizing and removing malodorous substances that are in the air that is being treated. The exact pH will depend upon the malodorous substances to be oxidized. Under usual circumstances, the pH should not be allowed to go below about 5 since there will be too little oxidant in the liquid phase for efficient scrubbing in tower 12. Under usual circumstances, the pH will be varied and maintained between about 5–10 to achieve optimum results for the particular air being treated. The pH control system comprises a pH sensor 50 which controls a pH control element 51 which controls the flow of one or more chemicals into the basin 16 by means of activating a pump to add reagent to the scrubber tower basin, to thereby control the pH.

The ORP "sensor" or "probe" 60 (FIG. 2) measures the oxidation-reduction potential of the solution in the scrubber basin 16. The output voltage of ORP probe 60 is then amplified by amplifier 21 and compared with the voltage on the slider 22 of potentiometer 23. The differential between the output of the amplifier 21 and the "set potential" SP on the slider 22 of the potentiometer 23 is amplified in amplifier 25 which has an output 26 within the range of 0 to 5 volts.

Figure 2:
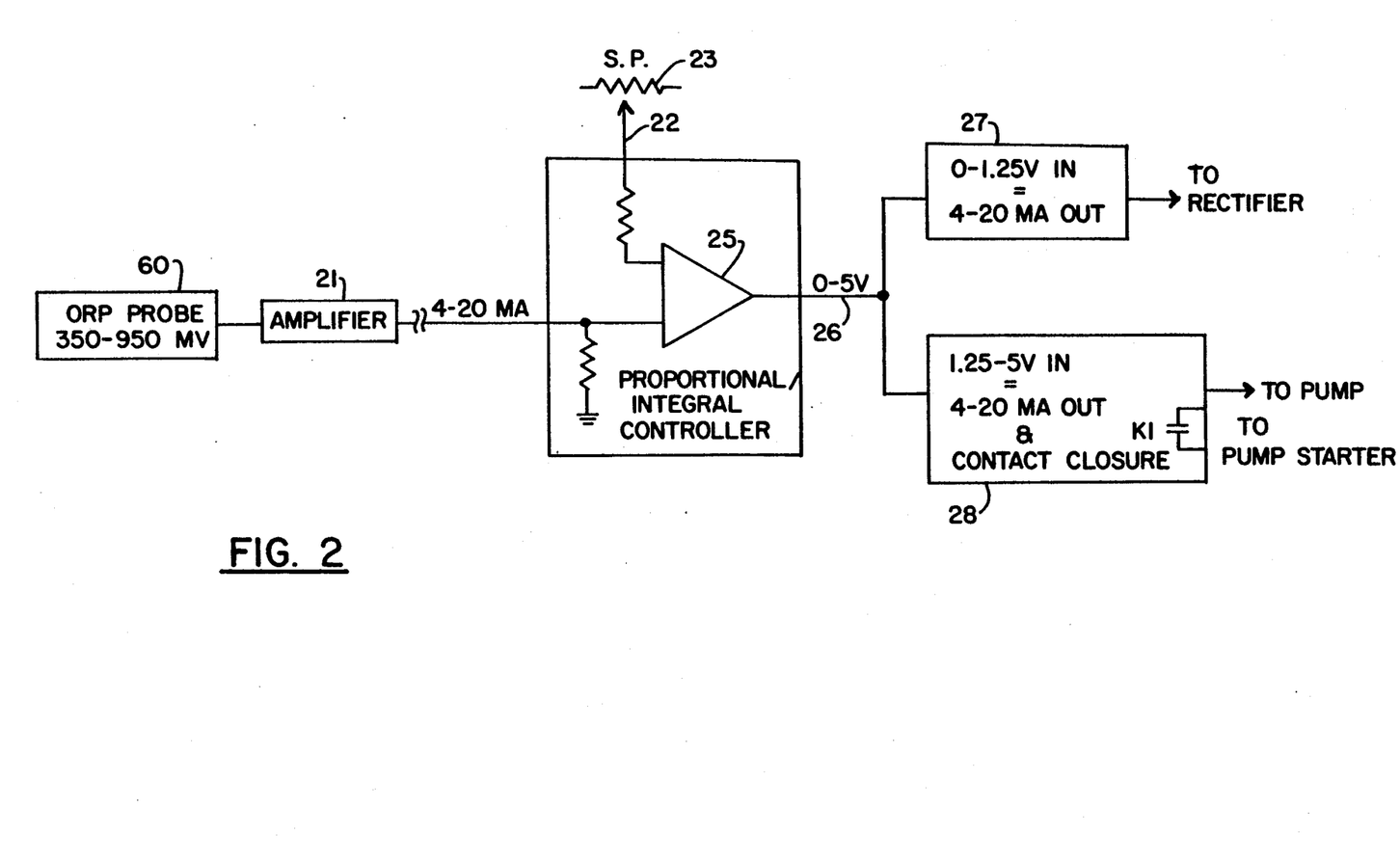
FIG. 2 is an electrical block diagram of the portion of the control system which determines how much on-site NaOCl is produced and also determines how much, if any, of the commercially available NaOCl is used, at any given time.

When the output 26 is at or below 1.25 volts, the output 26 controls only control element 27.

Control element 27 controls the current signal applied to the rectifier system of FIG. 6. This current signal is directly proportional to the voltage fed to the input of control element 27, so long as that input voltage does not exceed 1.25 volts.

Thus, control element 27 controls the strength or concentration of the sodium hypochlorite solution into the system during most normal operating conditions. The various elements 60 and 21 to 27 (FIG. 2) are selected and adjusted so that the amount of sodium hypochlorite produced by the electrochemical system 14 is equal to that needed to substantially eliminate the unwanted odors at the output of the scrubber 12. Further, when the voltage at the input of control system 27 is equal to 1.25 volts, the electrochemical system 14 is operating at its maximum capacity.

When the output voltage 26 rises to about 1.25 volts, the electrochemical system 14 continues to operate to generate sodium hypochlorite at its maximum rate, and in addition, control system 28 operates pump 64. The fluid delivery rate of pump 64 is directly proportional to the amount by which the output voltage 26 exceeds 1.25 volts. Below 1.25 volts the pump 64 is not running, and for an output voltage 26 of 5.0 volts, the pump 64 is running at the maximum speed it attains during the operation of the invention.

The pump 64 pumps sodium hypochlorite from storage tank 65 to the input of spray nozzle 500 via pipe 66 (FIG. 1).

Thus, the system embodying the invention works as follows:

During normal operation of the system the ORP probe 60 controls the "strength" or "concentration" of sodium hypochlorite solution added to the system by the electrochemical system 14; the voltage at output 26 varying from 0 to 1.25 volts.

When, however, the amount of odor producing materials passing through the scrubber exceeds the ability of the electrochemical system 14 to generate enough sodium hypochlorite to cancel substantially all of the odors, the output voltage 26 rises above 1.25 volts and operates the pump 64 to feed sodium hypochlorite from the tank 65 through pipe 66 to the sprayer 500 in sufficient quantity to substantially fully cancel all of the odor producing materials.

The ORP probe 60 is a conventional device well known in the art. This conventional device is exposed to the residual liquid in the basin 16. The ORP probe responds to the voltage created by the presence of $OCl^-$ ions in the basin. The NaOCl in the tank 12 reacts with the odorous compounds oxidized by NaOCl (which may be $H_2S$) according to the following equation:

$$4NaOCl + H_2S + 2NaOH \rightarrow Na_2SO_4 + 2H_2O + 4NaCl \quad (1)$$

$OCl^-$ ions are a product of the generation of NaOCl, per the following equation:

$$NaCl + H_2O \rightarrow NaOCl + H_2 \uparrow \quad (2)$$

The $OCl^-$ ion concentration is being proportionally depleted by the first reaction (Equation 1) above, or other such reactions involving odorous compounds capable of being oxidized by $OCl^-$. More $OCl^-$ is produced electrochemically from NaCl, per Equation 2, above, to match the level of oxidazable compounds capable of being oxidized by NaOCl, entering the odor control system.

The $OCl^-$ ions develop an electrical potential on the ORP probe 60. The ORP probe compares this potential with a standard reference potential and produces an output in the form of a voltage difference between the potential created by the $OCl^-$ ions and the reference voltage source. This differential voltage is then fed to the input of amplifier 21 (FIG. 2).

The ORP probe 60 is preferably of the platinum band type. It is designed to measure the oxidation reduction potential of the solution in basin 16. The probe 60 has an electrode which is gel filled and sealed to prevent internal damage or impairment from a corrosive atmosphere. This particular style of electrode never needs refilling with the potassium chloride electrolyte. The data on this probe is as follows:

| | |
|---|---|
| ORP Range: | −5000 mV to +5000 mV |
| Temperature Range: | −5 to 80 degrees Centigrade |
| Pressure Range: | 150 psi |
| Sensing Tip: | Platinum band, 99.99% pure, 0.25 inches outside diameter × 0.1 inches long. |
| Reference Type: | Silver/silver chloride half-cell, single or double junction, sealed. |
| Reference Electrolyte: | Gelled potassium chloride saturated with silver, silver chloride |
| Reference Junction: | Coaxial ceramic with dual pin ceramic. |

In FIG. 1, the aqueous brine solution in basin 16 is pumped out of the basin 16, through pipe 42, pump 18 and into bath (electrolytic cells) 14 for converting some of the brine solution into NaOCl, and through pipe 46 to spray nozzle 500. The positive electrode (anode) 140 (FIG. 6) is in the bath 14. The negative electrode (cathode) 141 contains the bath. The bath flows between anode and cathode. The brine solution containing NaOCl is then sprayed onto the filler 80 of the scrubber tower 12 and returns to the basin 16, after reacting with odorous contaminants in the gas entering inlet 10.

The pump 18 also pumps a representative sample of the brine solution via pipe 18a into reservoirs 50a and 60a containing pH probe 50 and ORP probe 60, respectively. The pH probe 50 feeds its output to the amplifier system of FIG. 3, as hereinafter explained which in turn controls elements 51 (FIG. 1) which add chemicals to the basin 16 in a conventional manner. Similarly, the ORP probe 60 controls an amplifier system of FIG. 3 which in turn controls (1) the rectifier system which feeds direct current to the electrodes of bath (electrolytic cells) 14 to generate on-site NaOCl and (2) pump 64 which pumps stored commercial NaOCl from tank 65 through pipe 66 to the recirculation system 500, 16, 18, 14, 46, 500, etc. Recirculation continues ad infinitum.

Placing the probes 50 and 60 in reservoirs 50a and 60a and pumping brine solution to them is chemically the equivalent of placing these probes in the basin 16.

Figure 3:
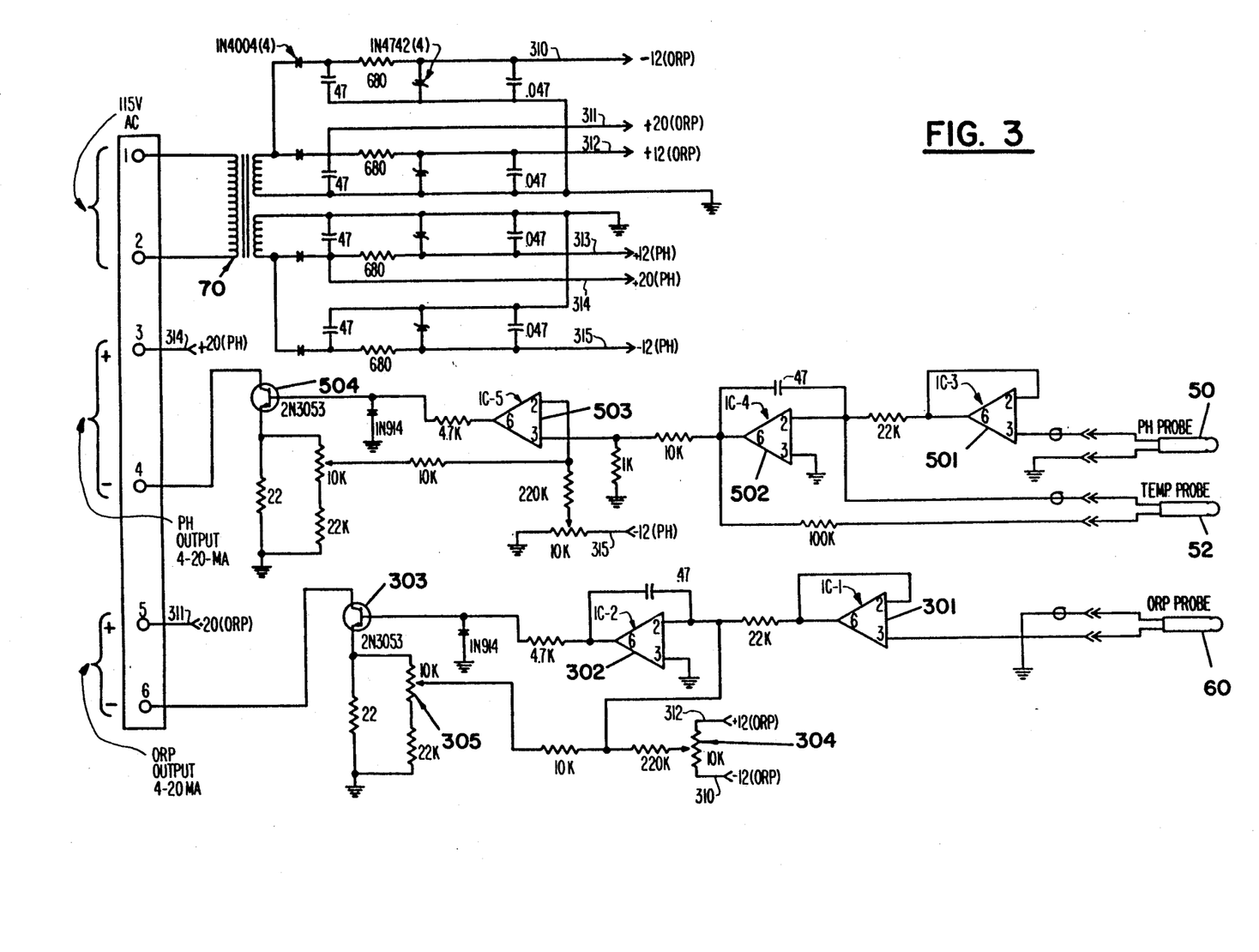
FIG. 3 is a schematic drawing of that portion of FIG. 2 which amplifies the outputs of the pH, ORP and temperature probes.

Referring to FIG. 3, all of the components between the ORP probe 60 and the terminals 5 and 6 comprise an amplifier for amplifying the output of the ORP probe 60. The principles for designing amplifiers are well known and this amplifier system, therefore, simply involves elementary electrical design principles. Thus, two operational amplifiers 301 and 302 and transistor 303 are essentially in a series relation.

Amplifiers 301 and 302 are RCA type CA3140E.

Potentiometers 304 and 305 select the output current for any given input, so that there is a 4 milliampere output (at terminals 5 and 6) for a 350 millivolt signal from ORP probe 60 and a 20 milliampere output (at terminals 5 and 6) for a 950 millivolt signal from the ORP probe 60.

The ORP probe 60 (FIG. 3) develops a voltage in the range of 0 to 950 millivolts. The ORP probe 60 is plugged directly into the ORP amplifier 301 (FIG. 3). Amplifier 301 provides a very high input impedance so as not to load the output of the ORP probe 60. Amplifier 301 has a voltage gain of one.

The output of amplifier 301 is fed to the voltage to current converter circuitry consisting of amplifier 302, transistor 303 and their associated components.

Again referring to FIG. 3, all of the components between pH probe 50 and temperature probe 52, on the one hand, and terminals 3 and 4 on the other hand, are part of an amplifying system. Here again such amplifying systems are well known in the art since automatic pH controls are well known. The portion of the pH control system shown in FIG. 3 comprises amplifiers 501, 502 and 503 (all of which are Said RCA type CA3140E), and a transistor 504. The signal from the pH probe 50 is amplified and converted to a 4 to 20 milliamp signal. The gain of the pH amplifier 503 is modified by the changing resistance of the temperature probe 52. The temperature probe 52 is installed in and responds to the same solution being monitored by the pH probe 50. changing the gain of the pH amplifiers 501, 502, 503 compensates the pH probe signal for varying temperature changes in the solution being monitored. The signals on terminals 3 and 4 (FIG. 3) operate a conventional pH controller to control the pH in basin 16 within the limits specified above.

The transformer 70 (FIG. 3) is fed by 115 volts a.c., and the voltages on its secondary windings are rectified and filtered, and apply the required voltages to the various other components of FIG. 3 as shown.

Terminals 1 and 2 of FIG. 3 are the 115 volt AC input to the power supply, and terminals 310 and 315 are the output of the power supply.

Wire 310 of the power supply feeds −12 volts d.c. to input 310 of potential 304, and also feeds pin 4 of amplifiers 301 and 302.

Wire 311 of the power supply is connected to wire 311 that feeds +20 volts, d.c. to output terminal 5.

Wire 312 of the power supply feeds +12 volts d.c. input 312 of potentiometer 304 and also to pins 7 of amplifiers 301 and 302.

Wire 313 of the power supply feeds +12 volts d.c. to pin 7 of amplifiers 501, 502 and 503.

Wire 314 of the power supply feeds wire 314 that is connected to pH output terminal 3.

Wire 315 of the power supply feeds −12 volts to pin 4 of amplifiers 501, 502 and 503, and to wire 315 (FIG. 3).

The three probes 50, 52, and 60 all respond to the liquid in basin 16 of the scrubber tower 12. They may not, however, be physically located in the basin. For example, the probes may be mounted to the side of the scrubber tower 12.

Figures 4, 4A:
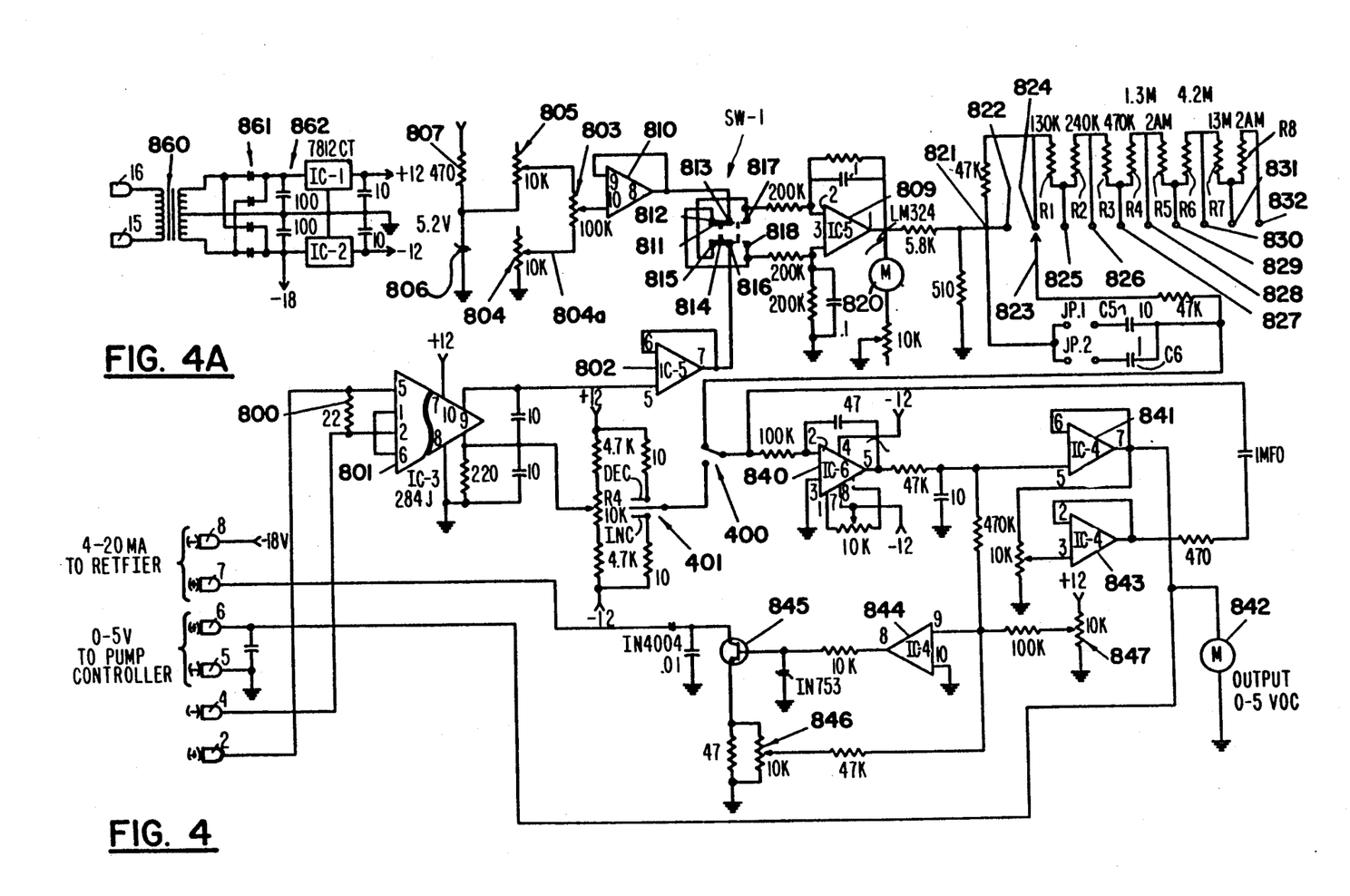
FIG. 4 is a schematic diagram of that portion of the control system of FIG. 2 which controls the rectifier current which produces on-site NaOCl and the speed of the pump which supplies the commercially available NaOCl.
FIG. 4A is the power supply for the apparatus of FIG. 4.

The current output signal of the ORP amplifier system 301, 302, 303 appears on terminals 5 and 6 of FIG. 3 and is fed to the Auxiliary Hypochlorite Controller shown in FIG. 4. The signals appearing on terminals 5 and 6 of FIG. 3 are fed to terminals 2 and 4 of FIG. 4 and appear across resistor 800.

In FIG. 4, switch 400 determines whether the "concentration" or "strength" of NaOCl fed into the system is controlled manually or automatically. When switch 400 is in the up position as shown, the system will automatically determine the "concentration" or "strength" of NaOCl sprayed into the top of scrubber tower 12 as fully explained and claimed in this application.

If, however, it is desired to control the "concentration" or "strength" of NaOCl manually, switch 400 is thrown down. The operator may then increase or decrease the "concentration" or "strength" of NaOCl fed into the system by moving switch 401. When switch 401 is thrown to DEC the concentration (strength) of NaOCl fed to the system is decreased and when switch 401 is thrown to INC the concentration (strength) of NaOCl fed to the system is increased. Except as specifically stated otherwise in this specification it is assumed that switch 400 is on AUTO and that the concentration (strength) of NaOCl used is determined automatically.

The "set point" is determined manually and determines the point where the apparatus starts pump 64 to add commercially available NaOCl from tank 65 to the system through pipe 66. The circuitry relating to the set point starts at +12 volts and passes through resistor 807 and Zenner diode 806. Three resistors 805, 803 and 804 are in series and the lower end of resistor 804 is grounded. The voltage at slider 803 is the set point voltage. To make sure that there is always a desired minimum set point voltage the variable resistor 804 is provided. Since its slider 804a is above ground there is always some voltage at slider 803, and therefore, always at least a minimal production of on-site NaOCl in bath 14. By setting resistor 804 and adjusting resistor 803 the set point voltage is selected. By varying the resistance of resistor 805, the set point range is varied. Amplifier 810 (IC-5) acts as a buffer, and its output feeds switch SW-1 which has two positions. When switch element 811 is between contact points 812 and 813 and switch element 814 is between contact points 815 and 816, switch SW-1 is in its first position. Switch SW-1 is in its second position when switch element 811 is between contact points 813 and 817 and switch element 814 is between contact points 816 and 818. Switch SW-1 enables the operator to reverse the input signals that are fed to the input pins 2 and 3 of operational amplifier 809. Switch SW-1 is provided because in some applications the user of the overall odor control system may wish to use an ORP probe that increases its voltage when it is desired for the amount of NaOCl fed to the scrubber to decrease. Such user may throw switch SW-1 to its second position. But for any given form of ORP probe switch SW-1 remains in one position.

Differential amplifier 809 determines the deviation of the output of amplifier 802 from the set point and the output of amplifier 809 represents the difference signal. The difference signal is indicated by meter 820 and is also fed to the input 821 of a bank of resistors R32 to R39. Meter M has a range from −1 ma to +1 ma, with 0 ma at center scale. Switch arm 823 can select any one or more of switch points 822 to 832. The farther to the right that switch arm 823 is moved, the more the resistance that is inserted in the circuit. It is desirable to select the desired amount of resistance as this determines the speed at which the system automatically corrects for changes in the ORP potential generated by the liquid in basin 16. It is usually not desirable for the system to respond rapidly to changes in voltage from ORP probe 60. Whenever a change in ORP potential is sensed it may be some time before there is a complementary change in the amount of NaOCl fed into the system. Even when there is a new rate at which NaOCl is fed into the system it may be some time before it reacts with the odors and then changes the character of the liquid in basin 16. Thus, it is desired to integrate and thereby slowly apply the changes in ORP potential. Amplifier 840 is, therefore, connected to capacitor C-13 so that it functions as an integrator. The speed of response of amplifier 840 depends on the amount of resistance between points 822 and 832, since the voltage on selector 823 is fed into pin 2 of integrator amplifier 840. When a jumper JP-1 is placed across its complementary contacts it adds capacitor C-5 (FIG. 4) to the system. Similarly, when a jumper JP-2 is placed across its complementary contacts it adds capacitors C-6 (FIG. 4) to the system. When capacity is added to the system by using one or both jumpers JP-1 and JP-2, the effect is just the opposite to adding resistance from resistor bank R32 to R39 to the system. The resistance values of the resistors R1 to R8 (FIG. 4) may be as follows:

| | |
|---|---|
| R1 | 130K |
| R2 | 240K |
| R3 | 470K |
| R4 | 1.3M |
| R5 | 2.4M |
| R6 | 4.2M |
| R7 | 13M |
| R8 | 24M |

The integrating action of amplifier 840 tends to provide smooth control over addition of both on-site and commercial (stored) NaOCl, even though the signals from ORP probe 60 may vary rapidly or even erratically. The more resistance of resistor bank R32 to R39, and the less capacity (capacitors C-5 and C-6) used, the smoother the operation of the parts being controlled.

Figures 5, 5A:
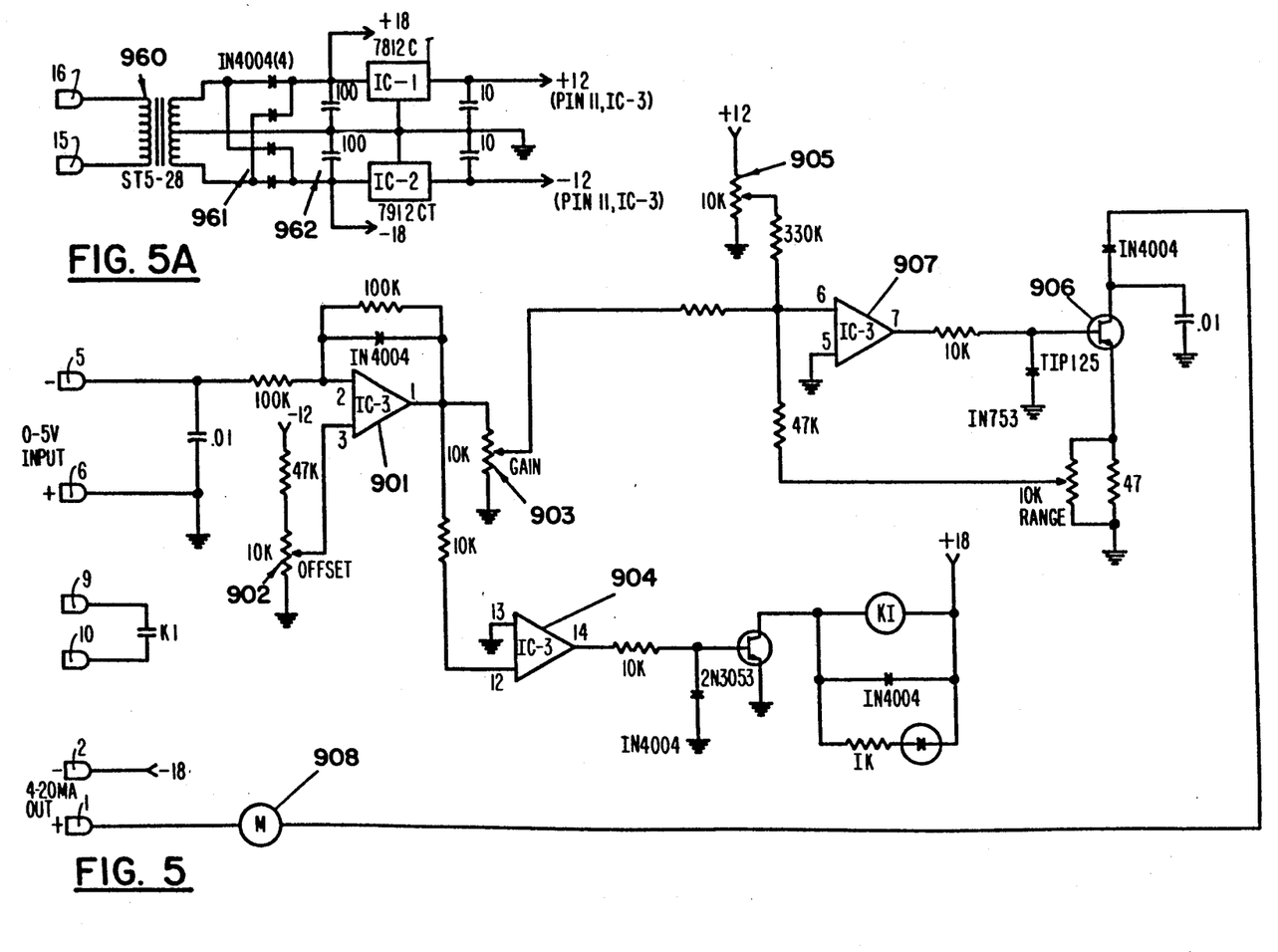
FIG. 5 is a schematic diagram showing further details of the system of FIG. 4.
FIG. 5A shows the power supply for the apparatus of FIG. 5.

The output of integrator-amplifier 840 is fed to buffer amplifier 841, the output of which feeds voltmeter 842 (which indicates at least between 0 and 5 volts), and also feeds output terminal 6 (FIG. 4) which in turn controls the pump 64 via the circuitry of FIG. 5.

The output of amplifier 841 also feeds the input of amplifier 843, the output of which provides feedback to pin 2 of amplifier 840.

The output of amplifier 840 also feeds amplifier 844 which feeds transistor 845 which in turn feeds output terminal 7 (FIG. 4) which as we shall see controls the direct current output at electrodes 140 and 141 (FIG. 6) and thus controls the rate at which on-site NaOCl is produced. Potentiometers 846 and 847 control the gain of the amplifying system 844, 845.

In FIG. 4 the amplifiers marked IC-3 are manufactured by Analog Devices and are Type Number 284J. The amplifiers marked IC-6 are manaufactured by National Semiconductor Corporation and are Type No. LM316H. The amplifiers 802, 841, 843, 844 marked IC-4 and IC-5 are also manufactured by National Semiconductor Corporation and are Type No. LM324.

The apparatus of FIG. 4A is the power supply for the components of FIG. 4 and includes the usual transformer 860, rectifiers 861 and filters 862.

The signals on output terminals 5 and 6 of FIG. 4 are fed to input terminals 5 and 6 of FIG. 5.

The output of terminals 7 and 8 of FIG. 4 controls the current output of the rectifier system of FIG. 6. In other words the direct current flowing between the electrodes 140 and 141 (FIG. 6), is controlled by the circuitry of FIG. 6 to be proportional to the current at output 140, 141 of FIG. 6 terminals 7 and 8 of FIG. 4. The output is then applied to electrodes 140 and 141 (FIG. 1) in the brine solution of bath 14 thereby adding NaOCl to that solution before that solution is fed to spray nozzle 500 at the top of scrubber tower 12. Thus, the amount of NaOCl produced on-site is determined by the various electrical components located between the ORP probe 60 and the output terminals 7 and 8 of FIG. 4.

The output of this circuitry is a 4-20 milliamp signal which is used to drive the rectifier system of FIG. 6 from 0 to 100 percent of its current rating.

The rectifier system of FIG. 6 is conventional and thus not illustrated in full detail Several versions of this circuit have been used in the prior art OdorMaster system described under the "Background of the Invention." The system of FIG. 6 simply takes the 4 to 20 ma. signal from terminals 7 and 8 of FIG. 4 and applies them to input 660, 660g (terminals 7, 8) of differential amplifier 650.

Three phase 60 Hz alternating current is fed into FIG. 6 on wires 601, 602 and 603. This current is fed to both the firing package 651 and the transformers 604, 605 and 606. Suitable firing packages are conventional equipment available on the open market. The firing package emits six firing pulses 613 to 618. Each firing pulse varies in length according to the amplitude of the 4 to 20 ma. current on terminal 7 (FIG. 4) which is fed to wire 660 (FIG. 6). When the current on wire 660 is only 4 ma. the pulses 613 to 618 are non-existent, that is they are of zero length. When the input current on wire 660 is 20 ma. the pulses 613 to 618 are at their maximum length as shown; that is pulse 615 begins when pulse 613 ends, pulse 617 begins when pulse 615 ends, pulse 614 begins when pulse 617 ends, pulse 616 begins when pulse 614 ends, pulse 618 begins when pulse 616 ends and the next pulse 613 begins when pulse 618 ends. These pulses are, therefore, sent in groups with each group beginning when the previous one ends. There are sixty such groups per second synchronized with the 60 Hz input current on wires 601, 602 and 603.

For currents between 4 and 20 ma. at the input 660 the length of each of the pulses 613 to 618 is directly related to the amount of the input current on wire 660. For example, if the input current on wire 16 is 5 ma., the length of the pulses would be 1/16 of their full length, that is 1/16 of the length they would have for a 20 ma. current. For each increase of 1 ma. in input current on wire 660 there is an increase in the length of the pulses 613 to 618 by 1/16 of the length that they have at 20 ma.

The operation of the prior art system of FIG. 6 will now be explained.

The 4 to 20 ma. current signal on input 660 is converted into a voltage signal by a suitable resistor 662. The lengths of the pulses 613 to 618 are directly related to the amplitude of this voltage signal. The pulses 613 to 618 turn on SCR rectifiers 607 to 612 respectively, thus allowing half wave currents to flow during each half cycle of each phase of the three phase current. When the input current at wire 660 is over 4 but less than 20 ma. the combined pulses on electrodes 140 and 141 is a pulsating direct current. At an input current on wire 660 of 20 ma. the output current to electrodes 140 and 141 is continuous.

The output currents from rectifiers 607 to 612 pass through tapped resistor (shunt) 670. The voltage on tap 671 is fed back to an input of differential amplifier 650. The differential amplifier 650 compares the voltage on wire 671 with the voltage from the upper end of resistor 662 and produces an output on wire 663 representative of the difference between the two input voltages to differential amplifier 650. When the two input voltages to differential amplifier 650 are equal there is no output on wire 663, no firing pulses, no current at electrodes 140, 141 and no on-site production of NaOCl. When, however, the voltage on wire 661 increases, there is an output on wire 663 which produces a rectified current through the shunt 670. The voltage on wire 671 will, therefore, rise until it equals the voltage on wire 661. The result is that the direct current through electrodes 140 and 141 (and the production of on-site NaOCl) will be directly related to the current at input 660 as explained above.

Figure 7A:
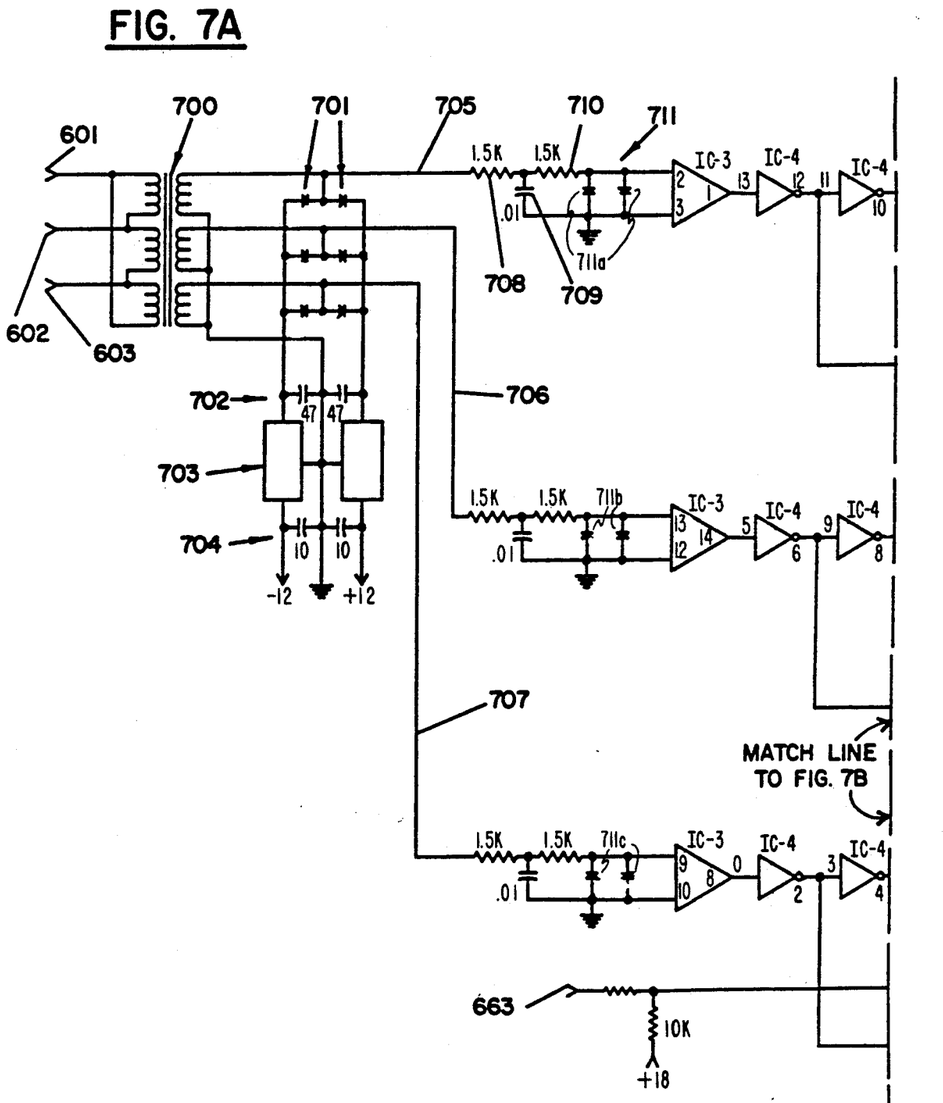
FIGS. 7A and 7B when put together along the match line comprise FIG. 7 which is a schematic diagram of the firing package 651 of FIG. 6.
Figure 7B:
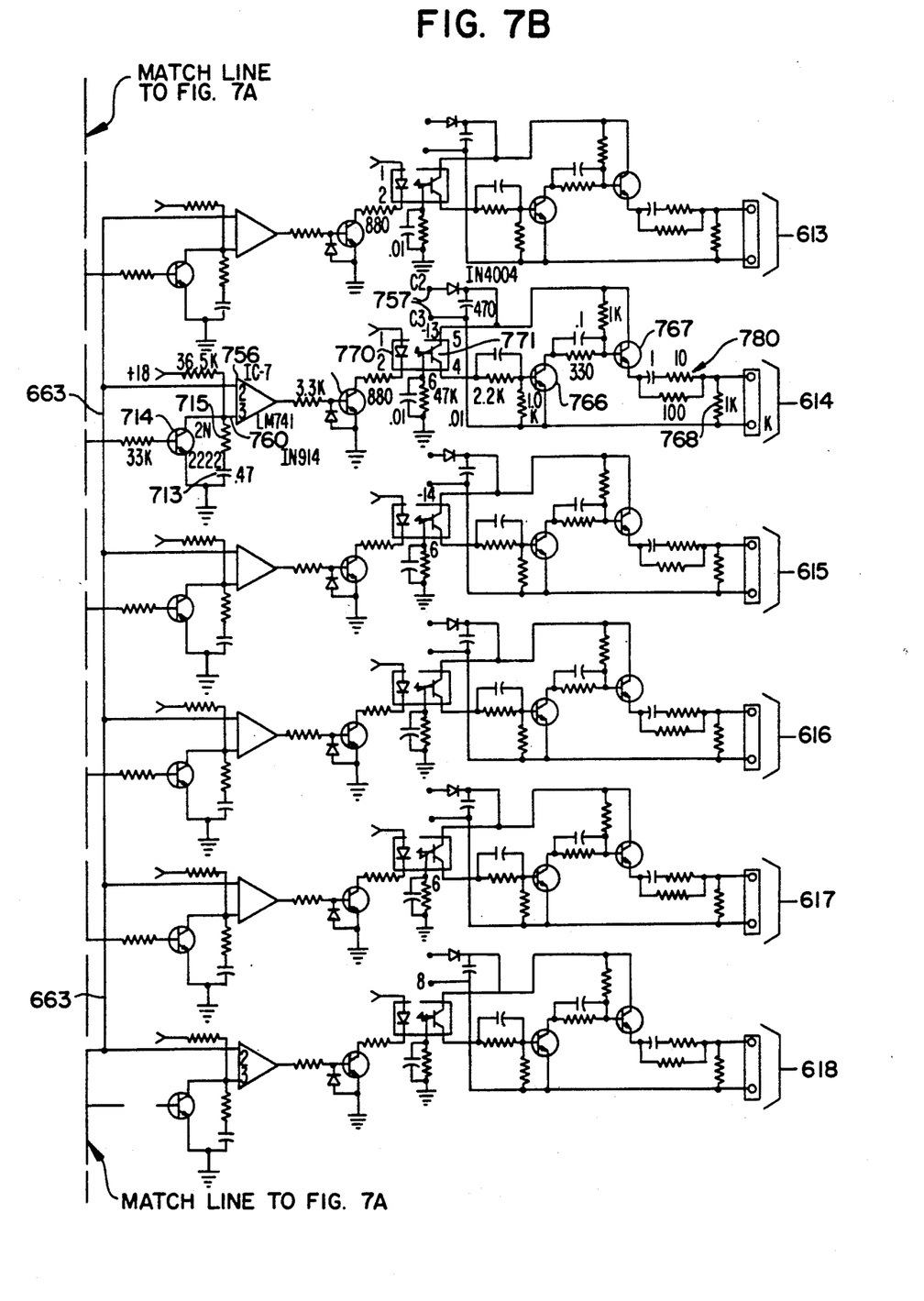

As stated above, FIG. 7 (FIGS. 7A and 7B combined) is a schematic diagram of the firing package 651 of FIG. 6.

Power is fed to the firing package from transformer 700 (FIG. 7). The three phase voltage out of this transformer is used for both power for the integrated circuits and for phasing signals for the firing package. The three phase power from the transformer 700 is fed to the three phase bridge circuit 701 consisting of six diodes (Type IN4044). The control power is rectified by the three phase bridge, filtered by capacitors 702, regulated by regulators 703 (IC-1, IC-2, types 7912 and 7812 respectively) and filtered again by capacitors 704. The plus and minus 12 volt power is used to power the integrated circuits on the firing package.

The three phase power at points 705, 706, and 707 are also used as phasing signals. Each of the three signals is filtered and shaped by identical circuitry. An explanation on phase A is as follows; The voltage at point 705 is fed to a filter consisting of resistor 708 and capacitor 709. This filter removes any voltage spikes that are present on the incoming three phase power. The signal is then fed through current limiting resistor 710 to clipping diodes 711. The voltage signal at the top of the clipping diodes is a clipped sign wave with a peak to peak voltage of 0.7 volts. This clipped signal is fed to differential amplifier IC-3 Output 1. This is amplifier has very high gain and is run open loop no feed back. The output of amplifier IC-3 (Type LM324) Output 1 is a square wave signal with timing the same as the 60 cycle input power of phase A on line 705. This square wave signal is fed to inverting amplifier IC-4 pin 13. This inverting amplifier inverts the square wave signal as well as decreasing the rise and fall time of the wave form. The output of inverting amplifier IC-4 (Type 4548) pin 12 becomes the reference signal for phase A. The output of inverting amplifier IC-4 pin 12 is fed to the input of inverting amplifier IC-4 pin 11. The output of inverting amplifier IC-4 pin 10 becomes the reference signal for the logical NOT phase A. At this point the three phase signal is converted to six phase signals. These signals are phase A, NOT phase A, phase B, NOT phase B, phase C, and NOT phase C. Each of these six signals is fed to identical circuitry. Clipping diodes 711a, 711b and 711c are preferably type IN914.

The following is an explanation of the continuation of phase A signal; The phase A square wave signal pin 12 of inverting amplifier 755 (IC-4) is fed to a ramp signal generator consisting of three resistors 712, 715 and capacitor 713 and transistor 714. When the square wave signal is a logical one, transistor 714 is conducting which shorts out the capacitor 713. When the square wave signal is a logical zero, the transistor does not conduct and the capacitor is allowed to charge to a positive voltage through resistors 715 The voltage at the top of capacitor 713 is a triangular wave form or ramp signal 760 This triangular wave form is fed to the non-inverting input of operational amplifier 756 (IC-7) pin 3. The operational amplifier 756 compares the ramp signal with the output signal 663 from differential amplifier 650 (FIG. 6). When the output signal 663 is more positive than the the ramp signal 760, the output of amplifier IC-7 pin 6 will be negative and transistor 765 (Type 2N222) will not conduct As the capacitor 713 charges, the voltage at point 760 become more positive. When the ramp voltage 760 exceeds the output voltage of from the differential amplifier 650 on line 663 (See FIGS. 6 and 7B), the output of amplifier 756 (IC-7) pin 6 will go positive and transistor 765 will conduct The output of amplifier 756 (IC-7) pin 6 is a pulse who's width is a function of the voltage level on line 663.

When the voltage on line 663 is high, the pulse width is narrow, when the voltage on line 663 is low, the pulse width is wide.

The output of transistor 765 drives an opto-isolator 770 (Type MCT2). An opto-isolator is a device containing a light emitting diode which is optically coupled to a photo sensitive transistor 771 in a package which is sealed from ambient light When current is passed through the light emitting diode, light is emitted which is detected by the photo sensitive transistor, causing the transistor 771 to conduct. The light emitting diode is electrically isolated from the photo sensitive transistor 771. When transistor 765 conducts, current is passed through the light emitting diode, causing the photo sensitive transistor 771 to conduct which in turn causes transistor 766 (Type 2N222) to conduct which in turn causes transistor 767 (Type T1P42A) to conduct which allows current from a.c. input 757 to pass through resistor 768. When current is passed through resistor 768 a voltage is developed which is the firing pulse 614 that is sent to fire the SCR 608 (FIG. 6) on. The firing pulse 614 is the same time duration as the pulse at the output of amplifier 756 (IC-7) but it has been shaped by the resistor/capacitor network 780 to provide a fast rise time with a high initial voltage which drops to nominal voltage for the balance of the pulse duration.

In the last two paragraphs a description of the portion of FIG. 7B which produced firing pulse 614 was described. Each of the other firing pulses 513, 615, 616, 617 and 618 is produced by circuitry described from pulse 614; it being understood, however, that inputs for the circuits are correct to produce the output signals (613 to 618) in the sequence described above.

When the SCR's 607 to 612 are fired, they conduct current through the electrolytic cells which in turn produces the sodium hypochlorite. The current first passes through the current measuring shunt 670. A voltage is developed across the shunt 670 that is proportional to the current through the shunt. This voltage is fed to the differential amplifier 650 by line 671. This voltage from the shunt is compared in amplifier 650 with the voltage 661 which is the reference. The output of amplifier 650 is a voltage that will force the SCR's 607 to 612 to either conduct for a longer or shorter period of time depending on the amplitude of the signal. If the voltage from the shunt 671 is less that the reference voltage 661, the output of amplifier 650 will force the SCR's to conduct for a longer period of time which produces a greater current through the shunt until the average voltage from the shunt is equal to the reference voltage. If the voltage from the shunt is greater than the reference voltage, the output of amplifier 650 will force the SCR's 607 to 612 to conduct for a shorter period of time, producing a lower current through the shunt until the voltage from the shunt is equal to the reference voltage. The previous action of the combination of the amplifier 650, firing package 651 and the SCR's 607 through 612 provide a constant current signal for the production of sodium hypochlorite.

FIG. 5 deals only with the control signal for controlling pump 64. The input on terminals 5 and 6 (FIG. 5) is fed to amplifier 901.

In FIG. 5, amplifier 901 has a gain of one. It has no output until the voltage on its pin 2 (from input 5) exceeds the voltage on pin 3. Thus, the operator can select a voltage on pin 3 by adjusting potentiometer 902. This voltage is set so that the pump motor 64 does not start until the capacity of the on-site NaOCl production is exceeded Previously we mentioned that when a voltage in FIG. 2 is below 1.25 volts the pump motor 64 does not run. This is achieved by selecting the desired voltage on potentiometer 902. Amplifier 904 has infinite gain so that once there is any output from amplifier 901 the output of amplifier 904 will be a maximum which in turn passes the necessary current through the armature coil K1 of a relay. The contacts of the relay K1 are connected across terminals 9 and 10 (FIG. 4) which are in series with the motor that drives pump 64.

The amplifier 907 converts the voltage signal at its input into a current signal In other words, the input voltage varies from 1.25 to 5 volts and this is converted to an output varying between 4 and 20 milliamperes. This current then passes through transistor 906, and through milliammeter 908 to output terminal 1 (FIG. 5).

The motor of pump 64 has an input whereby the motor speed increases from zero when the output current at terminal 1 (FIG. 5) is 4 ma. and is a maximum when that current is 20 ma. The speed of pump 64 is therefore, directly related to the current through meter 908.

The system may be controlled manually as follows: Switch 400 is thrown to MAN. In this case all of the circuitry from ORP probe 60 to and including amplifier 801 and all of the circuitry from potentiometer 803 to switching arm 823 is no longer in control of the system. The amount of NaOCl fed to the system is then controlled by switch 401. When switch 401 is on INC a 12 volt signal is applied to pin 2 of amplifier 840 through a 10,000 ohm resistor. The circuitry beyond amplifier 840 then increases the output of NaOCl in just the same way as during an increase in the voltage from ORP probe 60 during automatic operation; with, however, a high degree of integration. In that case, the on-site production of NaOCl will increase to its maximum and if, thereafter, switch 401 remains on INC the pump 64 will start and increase its speed to its maximum. If the switch 401 is thrown to DEC, the delivery of NaOCl will be continuously decreased, with, however, a high degree of integration.

I claim to have invented:

1. A system for controlling unwanted odor comprising:
    means, which manufacture a chemical that will react with said unwanted odor to neutralize the same, for at least partially neutralizing said unwanted odor with said chemical, said means for manufacturing said first-named chemical having such limited capacity that it will not fully neutralize said odor during peak odor conditions,
    another means for providing a chemical which will react with said unwanted odor to neutralize the same, and
    control means responsive to the amount of unwanted odor for controlling the production, up to a given limit, of said manufactured chemical at a rate related to the amount of said unwanted odor to be neutralized; said control means controlling said another means to provide a chemical under peak odor conditions to thereby further neutralize the odors.

2. A system as defined in claim 1, in which said first-named means includes recirculation means for recirculating a material including said first-named chemical and passing such material into contact with said unwanted odor.

3. The system of claim 1 in which said first-named means is manufacturing its chemical at substantially full capacity whenever said control means controls said another means to provide a chemical.

4. The system of claim 1 including manually operable set point means for selecting the conditions under which said control means controls said another means to provide a chemical to neutralize odor.

5. The system of claim 1 in which said first-named chemical is NaOCl and said first-named means manufactures such NaOCl electrochemically,
    said first-named means having a limited capacity for manufacturing NaOCl so that it cannot fully neutralize the odor under peak odor conditions,
    said control means including means for controlling said first-named means to generate NaOCl electrolytically, and for controlling said another means for supplying a said chemical, to neutralize odors, under peak odor conditions.

6. In a system as defined in claim 1:
    said control means including sensing means for determining the requirement for an odor neutralizing chemical,
    said sensing means having an output which controls said control means,
    said control means including means for integrating the output of said sensing means to thus provide smooth control over the addition of said chemicals by said control means.

7. A system as defined in claim 1 in which the manufactured chemical and the chemical provided by said another means are both NaOCl.

8. The process of neutralizing unwanted odors which may vary in amount, comprising:
    manufacturing a chemical that will neutralize said unwanted odors and applying said chemical to said unwanted odors to neutralize the same,
    controlling said manufacturing step to vary the amount of said chemical in accordance with the amount of said unwanted odors to be neutralized, but such manufacture being incapable of exceeding a given rate of production,
    storing a chemical which will neutralize said unwanted odors, and
    adding such stored chemical to the manufactured chemical when the amount of unwanted odors increases to a level beyond which said given rate of production will substantially neutralize substantially all of the unwanted odors.

9. The process defined in claim 8 in which the first-named chemical is NaOCl.

10. The process defined in claim 8 in which the stored chemical is NaOCl.

11. The process of claim 9 in which said manufactured NaOCl is produced by passing a direct current through an aqueous solution of sodium chloride.

12. The process of claim 11 in which the stored chemical is NaOCl and in which the amount of odor to be neutralized is determined by the amount of the $OCl^-$ ions used to neutralize the odors.

13. The process defined in claim 12 in which the amount of the manufactured NaOCl is varied in direct relation to the rate of depletion of the $OCl^-$ ions by compounds capable of being oxidized by NaOCl until the NaOCl manufacturing capacity of the system is reached and when that capacity is reached the stored NaOCl is applied to the unwanted odors, in addition to the manufactured NaOCl, as required to substantially neutralize all of the unwanted odors.

14. The process defined in claim 13 in which the concentration of the OCl⁻ ions determines the amount of stored NaOCl that is applied to the unwanted odors.

15. The process of claim 8 in which an aqueous solution of sodium chloride is recirculated, said recirculation occurring repeatedly with said chemicals being added to said recirculated solution, said recirculated solution reacting with said odor to neutralize the latter, and
   sensing the concentration of OCl⁻ ions in said solution and controlling the addition of said chemicals to said solution in accordance with said concentration.

16. The process of claim 15 in which said sensing step provides a control signal to control the addition of said chemicals to the solution,
   integrating said control signal to smooth out variations thereof and provide for smooth control over the additions of said chemicals.

17. The process of claim 15, comprising:
   providing a manually adjustable set point voltage,
   said sensing step producing a voltage,
   comparing said voltages and controlling the addition of said chemicals to said solution in accordance with the difference between said voltages.

18. The method of claim 8, comprising:
   providing a solution for carrying said chemicals,
   passing said solution into contact with said unwanted odor, and
   recirculating said solution.

19. The method defined in claim 8 in which the manufactured chemical and said stored chemical are both NaOCl.

20. In a system for neutralizing unwanted odor in a gas:
   a scrubber tower,
   means for passing said gas through said tower in one direction,
   means for passing a brine solution that includes NaOCl through said tower in a second direction opposite said first direction so that said NaOCl neutralizes the unwanted odor in said gas,
   recirculation means for recirculating the brine solution that passed through said tower so that it reenters said tower, said recirculation means including means for passing a direct current through the solution being recirculated so that NaOCl is manufactured and added to the solution being recirculated, said last-named means having limited capacity thereby limiting the rate at which said manufactured NaOCl is added to the system,
   another source of NaOCl, and
   control means responsive to the amount of NaOCl that is required to neutralize said odor and for controlling said direct current to produce, up to said limited rate, the amount of NaOCl manufactured so as to neutralize said odor,
   said control means including means for adding said NaOCl from said another source to said recirculated solution when the rate at which NaOCl must be added to said solution in order to neutralize said odor exceeds said limited rate.

21. In a system as defined in claim 20:
   said control means varying the amount of NaOCl from said another source fed into said recirculated solution, when the rate at which NaOCl should be added to substantially fully neutralize said odor exceeds said limited rate, so that said odor is substantially neutralized.

22. A system as defined in claim 20 in which said control means has an input signal that is responsive to the depletion of NaOCl in the solution, said control means controlling the rate at which said NaOCl is added to the solution according to said input signal.

23. A system as defined in claim 22 in which said includes integrating means for integrating input signal so that said control means smoothly controls rate at which NaOCl is added to the system.

24. A system as defined in claim 23 including means for varying said integrating means to control the amount of integration of said input signals so that the response of the control means to variations in said input signal may be varied.

25. In a system as defined in claim 20:
   said control means including means for providing a voltage and for varying such voltage to select a set point voltage,
   said control means having input means for producing an input signal varying according to the amount of NaOCl that should be added to the system to neutralize the odor,
   said control means including means for comparing said set point voltage with said input signal and for adding said NaOCl from said another source to said solution when the voltage of said input signal exceeds the set point voltage.

26. In a system as defined in claim 20:
   said control means including manual means for selecting a set point which determined when the demand for NaOCl is so great as to require addition of said NaOCl from said another source to said solution.

27. In a system as defined in claim 20:
   said control means varying said direct current to produce, up to said limited rate, said manufactured NaOCl at the rate required to approximately neutralize all of said unwanted odor.

28. In a system as defined in claim 27,
   said control means varying the amount of NaOCl from said another source, fed into said recirculated solution, to approximately fully neutralize said unwanted odor, when the rate at which NaOCl should be added to substantially fully neutralize said odor exceeds said limited rate.

29. The method of neutralizing unwanted odor in a gas, comprising:
   providing an aqueous brine solution, including NaOCl, and performing neutralization of said odors with said solution,
   recirculating said solution during the step of neutralizing said odors,
   sensing the oxidation reduction potential in said solution and calling for addition of NaOCl to the system when said potential changes in a predetermined way,
   passing a direct current through said solution to add electrochemically produced NaOCl to the solution, in response to said sensing step calling for additional NaOCl,
   another source of NaOCl,
   and adding NaOCl to the solution from said another source, when more NaOCl is required to neutralize said odor than is produced by said direct current, said production of NaOCl electrolytically having limited capacity, said addition of NaOCl from said another source taking place only when said sensing step calls for further NaOCl after said electrolytically produced NaOCl has reached said limited capacity.

30. In the method of claim 29, said NaOCl being added to said solution in approximately the smallest amount that will fully neutralize said odor.

31. In the process of claim 29:

the odors of said gas being substantially fully neutralized except under peak odor conditions by said electrochemically produced NaOCl, said gas having peak conditions during which the amount of NaOCl required to substantially fully neutralize said odors exceeds the amount of NaOCl that can be produced electrochemically under which conditions said NaOCl from said another source is added to the solution to supplement the electrochemically produced NaOCl.

32. In the method of claim 29:

said sensing step producing a control signal that controls the addition of both the electrochemically produced NaOCl and the NaOCl from said another source, said control signal being integrated to smooth out rapid variations therein, so that NaOCl is smoothly added to said solution.

* * * * *